(12) United States Patent
Chen et al.

(10) Patent No.: US 7,366,223 B1
(45) Date of Patent: Apr. 29, 2008

(54) MODIFYING HOPPING SEQUENCES IN WIRELESS NETWORKS

(75) Inventors: John Sze-Chi Chen, San Jose, CA (US); Brett Eric Schein, Sunnyvale, CA (US)

(73) Assignee: Arraycomm, LLC, San Jose, CA (US)

( * ) Notice: Subject to any disclaimer, the term of this patent is extended or adjusted under 35 U.S.C. 154(b) by 954 days.

(21) Appl. No.: 10/164,977

(22) Filed: Jun. 6, 2002

(51) Int. Cl.
*H04B 1/00* (2006.01)
(52) U.S. Cl. .................................... 375/132
(58) Field of Classification Search .............. 375/132, 375/133, 134, 137; 455/447, 526, 62, 63.3, 455/71, 113, 150.1; 370/302, 330, 343, 436, 370/478, 480, 481
See application file for complete search history.

(56) References Cited

U.S. PATENT DOCUMENTS

| | | | | |
|---|---|---|---|---|
| 5,079,768 A * | 1/1992 | Flammer | .................... | 370/349 |
| 5,541,954 A * | 7/1996 | Emi | ........................... | 375/133 |
| 5,737,359 A * | 4/1998 | Koivu | ........................ | 375/133 |
| 5,917,812 A * | 6/1999 | Antonio et al. | ............. | 370/337 |
| 6,295,310 B1 * | 9/2001 | Yamauchi et al. | .......... | 375/133 |
| 6,711,120 B1 * | 3/2004 | Laroia et al. | ................ | 370/204 |
| 6,807,226 B1 * | 10/2004 | Suetsugu et al. | ........... | 375/224 |
| 6,845,123 B1 * | 1/2005 | Nyberg et al. | .............. | 375/133 |
| 6,876,691 B1 * | 4/2005 | Roberts | ...................... | 375/133 |
| 7,027,418 B2 * | 4/2006 | Gan et al. | ................... | 370/329 |
| 7,054,346 B2 * | 5/2006 | Balachandran et al. | ..... | 375/130 |
| 2002/0122461 A1 * | 9/2002 | Hervey et al. | .............. | 375/132 |
| 2002/0141479 A1 * | 10/2002 | Garcia-Luna-Aceves et al. | .......................... | 375/132 |
| 2004/0029600 A1 * | 2/2004 | Johnson et al. | ............. | 455/500 |

\* cited by examiner

*Primary Examiner*—Sam K. Ahn
(74) *Attorney, Agent, or Firm*—Blakely Sokoloff Taylor & Zafman (57) ABSTRACT

The present invention can be used to modify hopping sequences and families of hopping sequences. In one embodiment the present invention includes modifying a family of hopping sequences by eliminating a resource from a plurality of resources used by the family of hopping sequences, eliminating a hopping sequence from the family of hopping sequences, and creating a new family of hopping sequences by replacing the eliminated resource in each remaining hopping sequence using the eliminated hopping sequence. Embodiments of the present invention may further include repeating eliminating a resource, eliminating a hopping sequence, and creating a new family of hopping sequences, until the new family of hopping sequences uses a desired number of resources.

41 Claims, 6 Drawing Sheets

MODIFYING HOPPING SEQUENCES IN WIRELESS NETWORKS

BACKGROUND OF THE INVENTION

1. Field of the Invention

The present invention applies to the field of wireless communications systems and, in particular, to modifying hopping sequences used for communications channels.

2. Description of the Prior Art

Mobile radio communications systems such as cellular voice and data radio systems typically have several base stations in different locations available for use by mobile or fixed user terminals, such as cellular telephones or wireless web devices. Each base station typically is assigned a subset of the frequencies available to the network operator. This subset is the "physical carrier set" available to the base station to use for communications with user terminals. This physical carrier set may have physical carriers that are different from those of neighboring base stations in order to avoid interference between neighboring base stations.

Each base station can organize the set of physical carriers into logical channels, i.e., traffic and overhead channels. For example, a logical channel may consist of a time slot in a TDMA (Time Division Multiple Access) frame on a physical carrier. A TDMA frame may contain, for example, eight downlink transmit time slots followed by eight uplink receive time slots. A physical carrier may be a 200 kHz band around a central frequency, such as 800 MHz or 1.9 GHz. This band represents a physical carrier frequency used by the base station and its user terminals for communication. Thus, a base station transmits to a given user terminal, for example, on the second transmit and receive time slots on this carrier frequency in a given frame. Furthermore, the logical channel may be organized using common techniques, such as FDD (Frequency Division Duplex), TDD (Time Division Duplex), FDMA (Frequency Division Multiple Access), and CDMA (Code Division Multiple Access).

Logical channels may further be defined by a hopping sequence. A hopping sequence indicates the sequence of resources used by a logical channel. For example, the hopping sequence may indicate that the logical channel hops carrier frequencies periodically. Frequency hopping is often used to counter fading and radio frequency (RF) interference. Fading due to multi-path propagation in the RF environment is generally frequency dependent, with different carriers experiencing different levels of fading. Frequency hopping can average the fading for many user terminals, so that no one terminal suffers severe fading. Frequency hopping can also serve to average interference among user terminals, since with each hop, each user terminal faces a different set of interferers of various intensities. Thus, in the long run, each user terminal experiences similar levels of interference, and no user terminal experiences severe interference.

Typically, the hopping sequences used by a wireless network to define logical channels are related in some way. A plurality of relating hopping sequences is referred to here as a family of hopping sequences. Families of hopping sequences are typically designed to have one or more desirable qualities. There are numerous ways of generating such families of hopping sequences. However, these families generally have predetermined sizes. For example, families generated using Orthogonal Latin Squares must have a prime power number of sequences.

BRIEF SUMMARY OF THE INVENTION

The present invention can be used to modify hopping sequences and families of hopping sequences. In one embodiment the present invention includes modifying a family of hopping sequences by eliminating a resource from a plurality of resources used by the family of hopping sequences, eliminating a hopping sequence from the family of hopping sequences, and creating a new family of hopping sequences by replacing the eliminated resource in each remaining hopping sequence using the eliminated hopping sequence. Embodiments of the present invention may further include repeating eliminating a resource, eliminating a hopping sequence, and creating a new family of hopping sequences, until the new family of hopping sequences uses a desired number of resources.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

A family of hopping sequences may use a certain number of resources. However, if the number of available resources is reduced, embodiments of the present invention may be used to modify the family of hopping sequences so that is only uses the available resources. Embodiments of the present invention may accomplish this while keeping intact one or more desired qualities of the hopping sequences. Furthermore, since embodiments of the present invention may use the original family of hopping sequences, no additional hopping sequences need to be stored to accommodate changes in the number of available resources.

Modifying Hopping Sequences and Families

Figure 1:
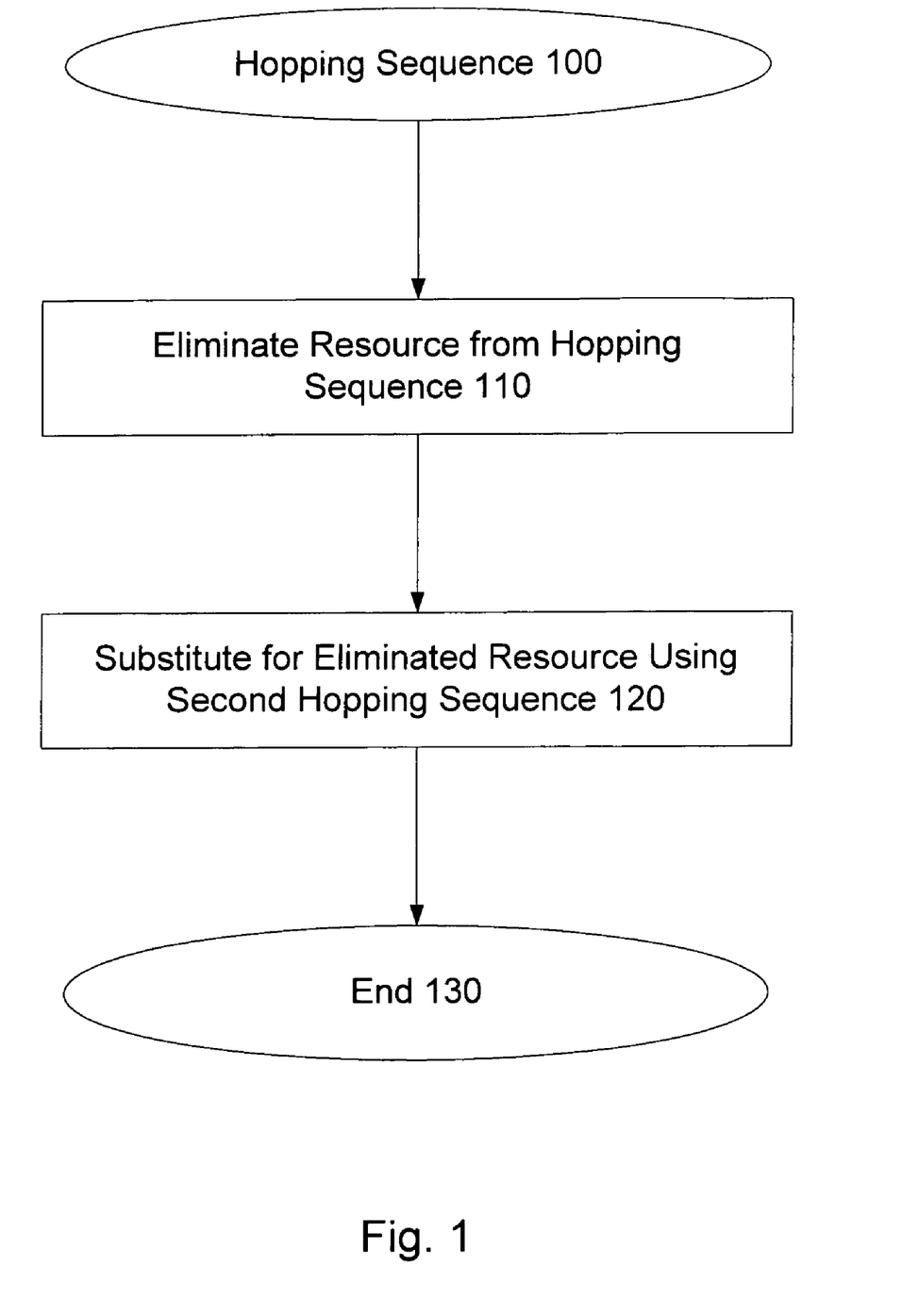
FIG. 1 is a flow chart of modifying hopping sequences according to one embodiment of the present invention.

One embodiment of the present invention is now described with reference to FIG. 1. FIG. 1 provides a flow chart for modifying a hopping sequence in a family of hopping sequences according to one embodiment of the present invention. The method of FIG. 1 begins 100 with a hopping sequence from a family of hopping sequences. Then, a resource is eliminated 110 from the hopping sequence. The resource to be eliminated may be chosen at random, or in any other fashion. In a wireless system, the resource to be eliminated from the hopping sequence may depend on the physical resources available to the system. After the resource is eliminated, the hopping sequence needs to be modified so that it does not indicate a hop to the eliminated resource. A resource may be eliminated, for example, in that a user terminal is preprogrammed with a hopping sequence that is configured for a predetermined number of resources, e.g. 24, but a current base station supports a different number of resources, e.g. 18. In order to use the hopping sequences preprogrammed on the user terminal, they must be modified.

Accordingly, the hopping sequence is modified by substituting 120 other resources for the eliminated resource using a second hopping sequence from the family of hopping sequences. In one embodiment, the second hopping sequence is eliminated from the family of hopping sequences if it is used for resource substitution. The resource substituted for the eliminated resource may be a resource in the second hopping sequence corresponding with the eliminated resource in the original hopping sequence. A corresponding resource may be the resource hopped to by the second hopping sequence at the same time that the original hopping sequence hops to the eliminated resource. In other words, if an original hopping function, F(t), defines the original hopping sequence, and a second hopping function, P(t), defines the second hopping sequence, then the modified hopping sequence may be defined by a modified hopping function, M(t), expressed as: $M(t)=F(t)$ for all t when F(t) is a resource used by the original hopping sequence, and $M(t)=P(t)$ for all t when F(t) is a resource that has been eliminated from the original hopping sequence.

The following explanation of hopping sequences is to aid understanding of the preceding discussion of FIG. 1 and other embodiments set forth further below. A hopping sequence represents the sequence of resources used by a logical channel over time. Hopping sequences can hop among resources such as frequency, time, code or a combination of these. For example, in a network using frequency hopping, each base station periodically changes the physical carrier used to communicate on a logical channel. That is, a base station transmitting on a logical channel using one physical carrier from a physical carrier set at one time will use a different physical carrier at another time. The physical carriers are typically selected only from the physical carrier set allocated to that base station. In a TDMA system, the frequency hop may take place between frames, or may be more frequent, such as every TDMA time slot, or less frequent, such as every fifth frame.

Logical channels may not only hop frequency. They may also hop time slots, code, location, or a combination of all or some of these resources. For example, a logical channel may hop time slots. That is, the base station and the user terminal may switch time slots with each hop. For example, a base station transmitting on a logical channel using the first time slot of a TDMA frame may use a different time slot on a subsequent TDMA frame. Code may hop in a similar fashion. Also, multiple resources may hop simultaneously. In some portions of the following discussion, hopping will be referred to in terms of resources.

Hopping sequences are generally defined by hopping functions. For example, if the resource is frequency and A-D are physical carriers, the sequence B, A, D, C may be a hopping sequence. In other words at time 1 the physical carrier frequency used by the logical channel is B. At time 2 it is A, and so on. A mapping from the time to the frequency is a hopping function. For example, this hopping function, function F, maps time 3 to frequency D. In other words, $F(\mathbf{3})=D$. Thus, a hopping function is just another way to express a hopping sequence. Since a hopping function uniquely defines a hopping sequence, the two phrases may be used interchangeably. The present description refers to hopping sequences or hopping functions as appropriate based on clarity and ease of understanding.

Another example of a hopping sequence may be a frequency hopping sequence represented as $f_0, f_1, f_2$, where each f is a different carrier frequency. A logical channel using this hopping sequence would use frequency $f_0$ at time 0, frequency $f_1$ at time 1, frequency $f_2$ at time 2, frequency $f_0$ at time 3, and so on. This is a periodic hopping sequence, since it repeats upon termination. Due to storage requirements, many hopping sequences are periodic, although they do not have to be. Furthermore, the periods of periodic hopping sequences may vary widely, and will typically be longer than three. The hopping function that defines this sequence can be represented as a function that maps time to frequency. In this case, denoting the function F(t), $F(\mathbf{0})=f_0$, $F(\mathbf{1})=f_1$, $F(\mathbf{2})=f_2$, $F(\mathbf{3})=f_0$, and so on.

A family of hopping sequences is a set of hopping sequences designed to be used by a set of logical channels. The family of hopping sequences can be designed so that a different hopping sequence can be assigned to each logical channel. In a family of hopping sequences, each hopping sequence generally hops over the same set of frequencies. An example family of hopping sequences to hop over carrier frequencies $f_0, f_1, f_2$ could be:

$S_0=f_0, f_1, f_2$ $S_1=f_1, f_2, f_0$ $S_2=f_2, f_0, f_1$;

where each hopping sequence S may be used by a logical channel. Hopping sequences are typically represented by a sequence of indexes that are associated with resources, such as carriers, by means of a look-up table. Thus, hopping sequence $S_0$ may be stored as indexes 0, 1, 2. For ease of understanding, however, portions of the discussion below show hopping sequences in terms of resources rather than indexes.

As discussed above, a family of hopping sequences will typically have one or more desirable qualities. For example, it may be desirable to have each logical channel use all available resources while hopping, but not to have two logical channels ever hop to the same resource at the same time. The family of three hopping sequences S above has this quality. It may also be desirable that logical channels at two or more base stations use the same resources but not hop to the same resource at the same time. There may be other desirable qualities that a family of hopping sequences can have.

There are many ways to generate and design families of hopping sequences with one or more desired qualities. For example, families of hopping sequences may be designed by constructing Orthogonal Latin Squares (OLS). Some of these methods can only produce families of certain fixed sizes using a certain number of resources. For example, OLS-based families can only be designed for a prime power number of resources. Thus, OLS cannot be used to design a family of hopping sequences to hop over 24 frequencies, but it can be used to design a family using 25 sequences, since 25 equals 5 (a prime) to the power of 2. As a result, the family of hopping sequences will be different if the number of resources is changed. Thus, if the number of available resources changes, or is not predetermined, each different family must be designed and stored independently. This is true not only of OLS-based families, but also of families generated using other methods, such as methods involving minimizing worst-case collisions on each resource used by each base station.

The embodiment of the present invention described above with reference to FIG. 1 results in one hopping sequence from the family of hopping sequences using one less resource than originally. Additional resources may be eliminated by repeating the embodiment in FIG. 1 on the modified hopping sequence. Furthermore, all other hopping sequences of the family of hopping sequences may be modified in similar manner using the second hopping sequence.

Figure 2:
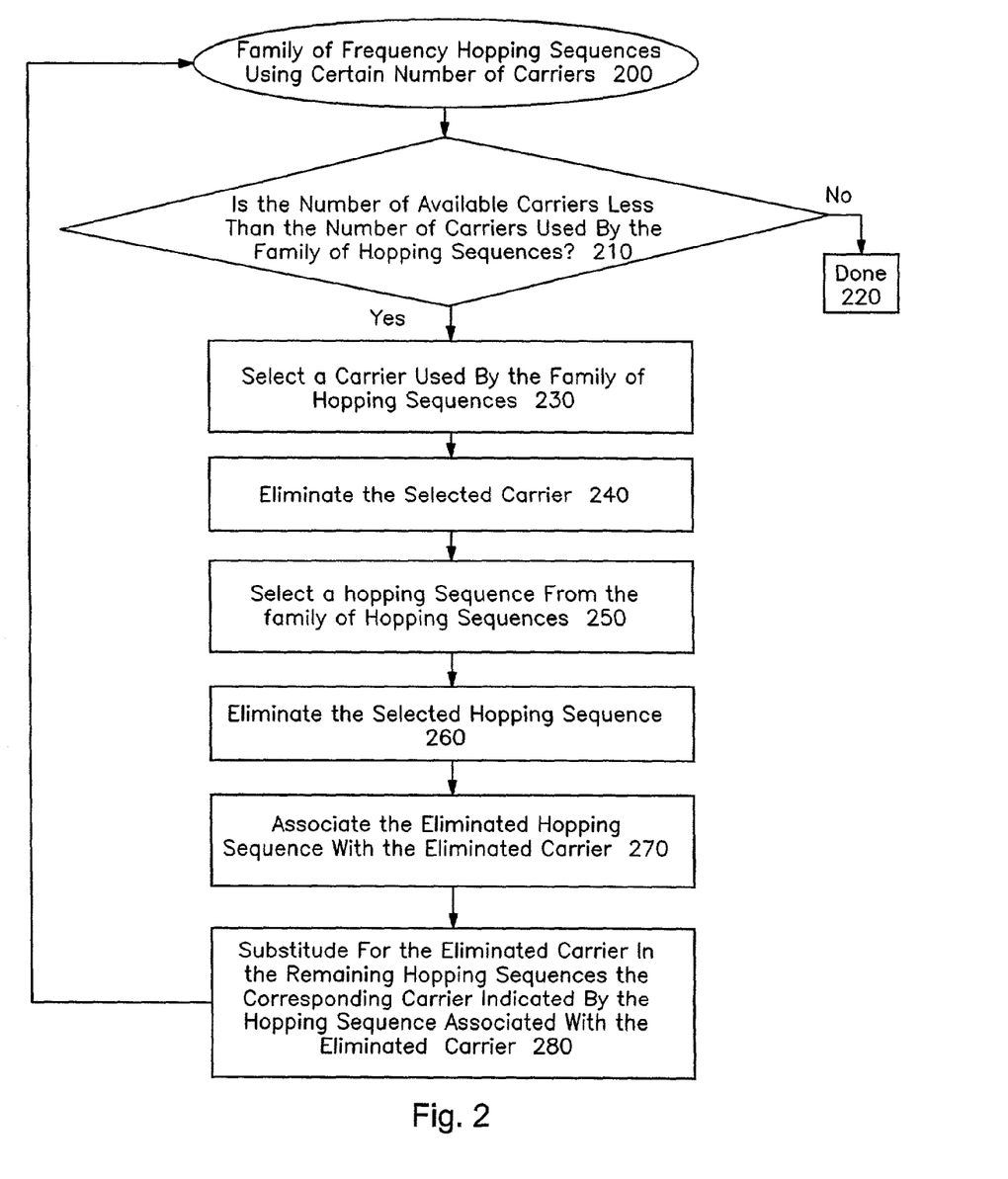
FIG. 2 is a flow chart of modifying a family of hopping sequences according to another embodiment of the present invention.

FIG. 2 provides a flow chart for modifying a family of hopping sequences according to one embodiment of the present invention. In the example of FIG. 2, the resource that hops is carrier frequency, however the example can be applied to any other resource or combination of resources. FIG. 2 begins 200 with a family of frequency hopping sequences. The family of hopping sequences uses a certain number of carriers to hop over. Next, a determination is made 210 whether the number of carriers available to the system or specific system device, such as a base station or a user terminal, is less than the number of carriers used by the family of hopping sequences. The number of carriers available to a device, such as a base station, may be caused by carrier allocation, by interference on some carriers, by geographic RF variations, or other reasons. If the number of available carriers is greater than or equal to the number of carriers used by the family of hopping sequences, then the hopping sequences in the family will never indicate a hop to an unavailable carrier. Thus, no modification is needed, the method is done 220, and can begin anew 200 at another time or with a different family of hopping sequences.

However, if the answer is yes, then one or more hopping sequences in the family will at one or more times indicates hops to unavailable carriers. In this case, the family of hopping sequences can be modified to compensate for the shortage of available carriers. In one embodiment, this is done by first selecting 230 a carrier used by the family of hopping sequences to be eliminated. Generally, it does not matter which carrier is selected, since the hopping sequences themselves merely contain representations or indexes of carriers. In an actual wireless system, the carrier index to be eliminated in the hopping sequences may correspond in the look-up table to a physical carrier that is unavailable to the system. Then, the selected carrier is eliminated 240 from the hopping sequences in the families. This elimination need not be a physical removal of the carriers or indexes from the hopping sequences. The stored sequences may remain intact, and the elimination may consist of a rule that the eliminated carrier is no longer a valid output of the hopping functions.

Then, a hopping sequence is selected 250 from the family of hopping sequences. This selection may be arbitrary, or according to some coordinated scheme between the base station and the user terminal. For example, in an OLS-based family of frequency hopping sequences there are initially an equal number of carriers and hopping sequences, which can be labeled with identical labels. Then, if a carrier is eliminated, the hopping sequence to be eliminated is the hopping sequence with the same label.

Next, the selected hopping sequence is eliminated 260 from the family of hopping sequences. Again, this elimination need not be a physical removal of the hopping sequence. It may be expressed as a rule that the eliminated hopping sequence is no longer a valid or available or allowable hopping sequence.

Then, the eliminated carrier is associated 270 with the eliminated hopping sequence. Then, the family of hopping sequences is modified by substituting 280 for the eliminated carrier in the remaining (non-eliminated) hopping sequences corresponding carriers indicated by the eliminated hopping sequence associated 270 with the eliminated carrier. A corresponding carrier may be defined in a manner similar to the discussion of FIG. 1 above. The modified family of hopping sequences has one less hopping sequence and uses one fewer carrier than the original family 200. However, the modified family is also a family of hopping sequences, and the process may begin anew 200 in an iterative fashion until the number of carriers used by the family of hopping sequences equals the number of carriers available to the system or to the applicable parts or devices of the system.

Figure 3:
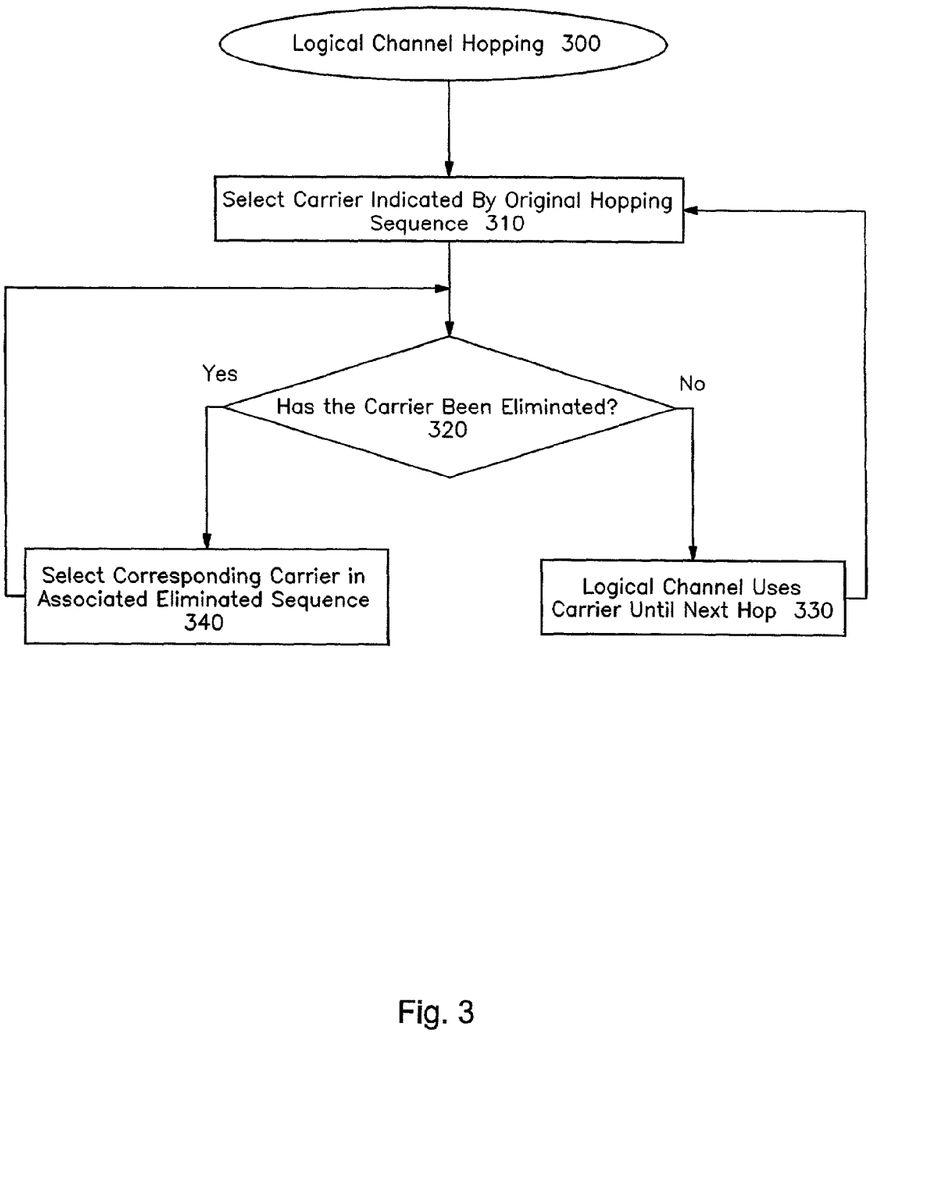
FIG. 3 is a flow chart of frequency hopping on a logical channel according to one embodiment of the present invention.

While FIG. 2 demonstrates one embodiment for setting up the modification for a family of hopping sequences, FIG. 3 provides a demonstration of frequency hopping on a logical channel according to one embodiment after the modification has already taken place. The process described with reference to FIG. 3 may be combined with on-the-fly modification to provide real-time modification of hopping sequences. A logical channel using a hopping sequence from a family of frequency hopping sequences that has been modified according to an embodiment of the present invention may hop in a manner now described with reference to FIG. 3.

In one embodiment, a processor on the user terminal may choose the next carrier for a logical channel that uses a hopping function by selecting 310 the carrier indicated by the original hopping sequence, that is, the hopping sequence, as it originally existed in the family prior to modification. Next, a determination 320 may be made whether the selected carrier has been eliminated due to modification. If not, then the selected carrier indicated by the hopping sequence at this time is available and may be used 330 for communications by the logical channel until the next hop.

However, if the carrier indicated by the original hopping sequence has been eliminated, the logical channel selects 340 the carrier indicated by the hopping sequence associated with the eliminated resource. This association may be similar to the association described with reference to FIG. 2. The elimination of multiple carriers may result in the associated eliminated hopping sequence used for substitution also indicating an eliminated carrier for the current selection. Thus, a new determination 320 may indicate whether the substitute carrier has been eliminated. The process may continue according to the embodiment described with reference to the flow chart in FIG. 3. As shown in FIG. 3, the loop between the determination 320 and the hopping to the corresponding carrier indicated by the associated hopping sequence may be traversed multiple times before the logical channel uses 330 a carrier. It is possible to modify certain families of hopping sequences in certain ways that may result in an infinite loop. If care is taken to avoid this, an infinite loop will not occur.

Demonstrative Example

Table 1 shows an example of a family of hopping sequences that can be modified according to one embodiment of the present invention. In Table 1, the family has five hopping sequences, $S_0$-$S_4$, which hop over five carriers, $f_1$-$f_5$.

TABLE 1

|  | $t_0$ | $t_1$ | $t_2$ | $t_3$ | $t_4$ |
| --- | --- | --- | --- | --- | --- |
| $s_0$ | $f_1$ | $f_2$ | $f_3$ | $f_4$ | $f_5$ |
| $s_1$ | $f_2$ | $f_3$ | $f_4$ | $f_5$ | $f_1$ |
| $s_2$ | $f_3$ | $f_4$ | $f_5$ | $f_1$ | $f_2$ |
| $s_3$ | $f_4$ | $f_5$ | $f_1$ | $f_2$ | $f_3$ |
| $s_4$ | $f_5$ | $f_1$ | $f_2$ | $f_3$ | $f_4$ |

For example, at time $t_2$, hopping sequence $S_2$ indicates a hop to carrier $f_5$. It can be observed that no two hopping sequences ever hop to the same carrier at the same time. In this example, there are only three carriers available. Thus, the family of hopping sequences can be modified by eliminating two carriers and two hopping sequences according to one embodiment of the present invention.

First, in this example, carrier $f_5$ is selected for elimination. The hopping sequence chosen to be used for substituting for the eliminated resource $f_5$ is $S_4$ in this example. Table 2 shows the new family of hopping sequences resulting from replacing $f_5$ with corresponding carriers of $S_4$ in the remaining hopping sequences.

TABLE 2

|  | $t_0$ | $t_1$ | $t_2$ | $t_3$ | $t_4$ |
| --- | --- | --- | --- | --- | --- |
| $s_0$ | $f_1$ | $f_2$ | $f_3$ | $f_4$ | $f_4$ |
| $s_1$ | $f_2$ | $f_3$ | $f_4$ | $f_3$ | $f_1$ |
| $s_2$ | $f_3$ | $f_4$ | $f_2$ | $f_1$ | $f_2$ |
| $s_3$ | $f_4$ | $f_1$ | $f_1$ | $f_2$ | $f_3$ |

Since these sequences hop over four carriers, one more carrier should be eliminated in this example. Table 3 shows the new family of hopping sequences resulting from eliminating $f_4$ and $S_3$, and replacing $f_4$ with corresponding carriers of $S_3$ in the remaining hopping sequences.

TABLE 3

|  | $t_0$ | $t_1$ | $t_2$ | $t_3$ | $t_4$ |
| --- | --- | --- | --- | --- | --- |
| $s_0$ | $f_1$ | $f_2$ | $f_3$ | $f_2$ | $f_3$ |
| $s_1$ | $f_2$ | $f_3$ | $f_1$ | $f_3$ | $f_1$ |
| $s_2$ | $f_3$ | $f_1$ | $f_2$ | $f_1$ | $f_2$ |

It can be observed, that in this new family of hopping sequences, like in the original family of hopping sequences in Table 1, no two carriers ever indicate a hop to the same carrier at the same time. In this embodiment, the modification has preserved this quality of the original family of hopping sequences. The new family of hopping sequences shown in Table 3 may be stored in a memory on a user terminal or base station in a modified state. This memory may be located in any device accessible by the remote terminal or the base station, including some memory element located on these communications devices. For example, the memory may be a ROM in a user terminal, such as the user terminal described in FIG. 6. The memory may also be memory on a processor, such as CPU 68 in FIG. 6.

Table 3 may also be stored as rules to interpret the original Table 1 on any of the memory locations mentioned above. For example, in Table 1, $S_0$ at time $t_4$ indicates a hop to $f_5$. A rule may state that $f_5$ is an eliminated carrier. In this case, the hop indicated is the carrier corresponding with $f_5$ in the associated hopping sequence S4, which is $f_4$. However, a rule may also state that $f_4$ is an eliminated carrier. In this case, the hop indicated is the carrier corresponding with $f_4$ in the associated hopping sequence $S_3$, which is $f_3$. Carrier $f_3$ is not an eliminated carrier and is thus the carrier to be used. Accordingly, Table 3 at time $t_4$ indicates a hop to $f_3$ for hopping sequence $S_0$.

Contextual Example

Figure 4:
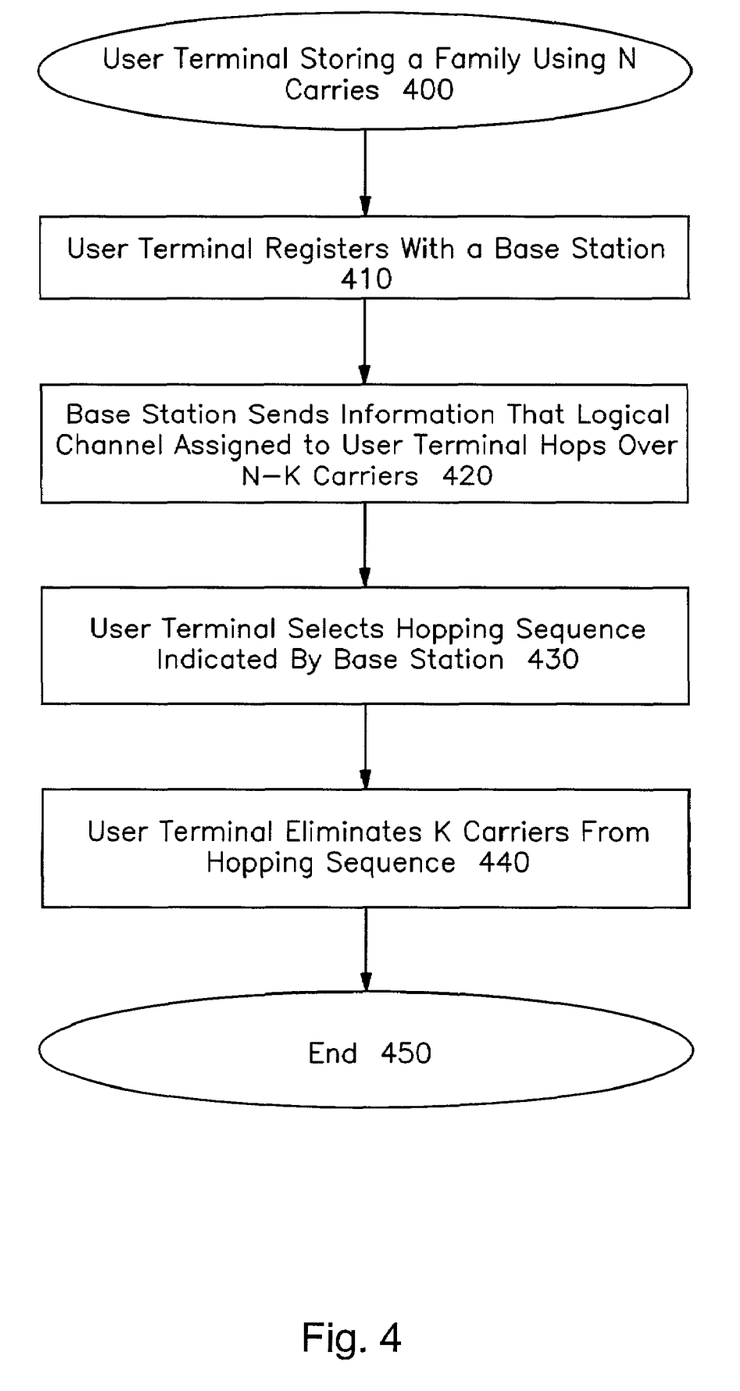
FIG. 4 is a flow chart of user terminal registration according to one embodiment of the present invention.

An example use of one embodiment of the present invention can be understood with reference to FIG. 4. FIG. 4 is a flow chart describing some actions that may occur when a user terminal registers with a base station. The user terminal in this example has a family of hopping sequences stored in memory that hop over N carriers, N being some whole number 400. Upon arrival to the base station, the user terminal registers 410 with the base station. During registration, the user terminal and the base station exchange various information. As part of this information, the base station sends 420 to the user terminal the information that the logical channel assigned to the user terminal hops over N–k carriers, k being some whole number less than N. The logical channel may hop over N–k carrier because that is the number of carriers allocated to the base station, because that is the number of high-quality carriers available to the base station is that geographical area, or other reasons. The base station may also indicate which original hopping sequence to modify in order to reduce the number of carriers hopped over to N–k.

Next, the user terminal selects 430 the original hopping sequence indicated by the base station. The user terminal then eliminates 440 k carriers from the selected original hopping sequence according to any embodiment of the present invention. For example, the user terminal may use an embodiment described with reference to FIG. 1 or FIG. 3. A similar process can be applied to peer-to-peer and wireless hot spot communications.

In the preceding example, the user terminal stores a single family of hopping sequences that can be modified according to embodiments of the present invention to form new hopping sequences or families that can accommodate fewer available carriers than the original stored family of hopping sequences. According to some embodiments of the present invention, these modified hopping sequences may be generated on-the-fly without being stored in permanent memory.

Base Station Structure

Figure 5:
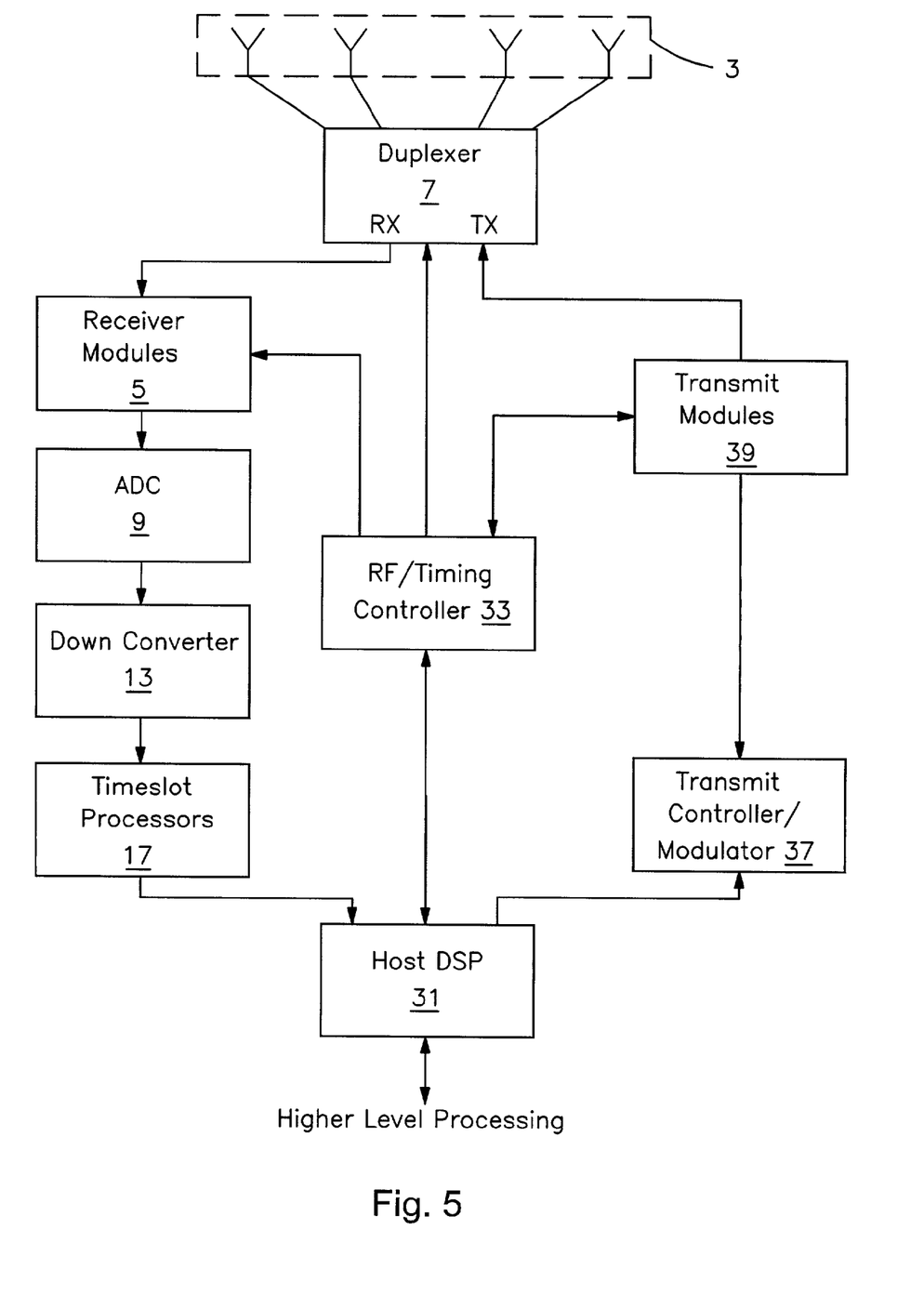
FIG. 5 is a simplified block diagram of a base station on which an embodiment of the invention can be implemented.

FIG. 5 shows an example of a base station of a wireless communications system or network suitable for implementing the present invention. The system or network includes a number of subscriber stations, also referred to as remote terminals or user terminals, such as that shown in FIG. 6. The base station may be connected to a wide area network (WAN) through its host DSP 31 for providing any required data services and connections external to the immediate wireless system. If embodiments of the present invention are implemented in a system supporting spatial diversity, a plurality of antenna 3 may be used, for example four antennas, although other numbers of antennas may be selected. Otherwise, one antenna may suffice.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. No. 5,828,658, issued Oct. 27, 1998 to Ottersten et al. and U.S. Pat. No. 5,642,353, issued Jun. 24, 1997 to Roy, III et al. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the present example, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 17 (hereinafter "timeslot processor") for further processing, including calibration, according to one aspect of this invention. Eight Motorola DSP56300 Family DSPs can be used as timeslots processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station. Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33.

The RF timing controller 33 interfaces with the RF system, shown as block 45 and also produces a number of timing signals that are used by both the RF system and the modem. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 35. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 35. The transmit modules 35 up-convert the signals to the transmission frequency and amplify the signals. The amplified transmission signal outputs are sent to antennas 3 via the duplexer/time switch 7.

User Terminal Structure

Figure 6:
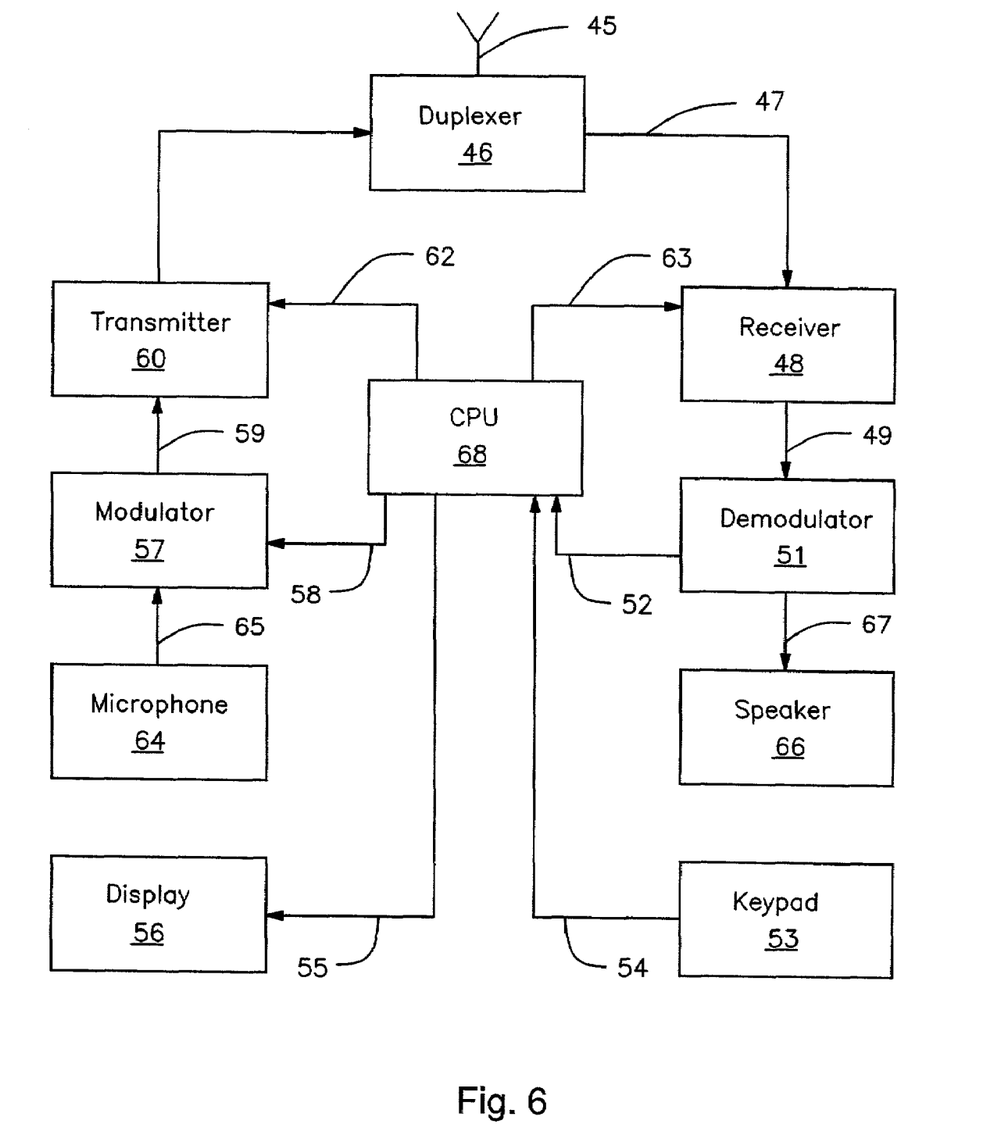
FIG. 6 is a simplified block diagram of a remote terminal on which an embodiment of the invention can be implemented.

FIG. 6 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 66, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 5 and 6, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using frequency hopping and spatial processing. These devices may be cellular phones, PDA's, laptop computers, or any other wireless devices.

In portions of the description above, the resource hopping is sometimes described above as taking place frame to frame. However any time interval may be used between hops. The hops may be time-synchronized across the network, and even across other networks. This synchronization may be achieved by various methods, including synchronizing to a satellite signal, such as a GPS signal. However, the present invention is also applicable in non-synchronized networks. Alternatively, the hops may be time-synchronized, but the hop intervals may vary in length from one user terminal to another, or even from one hop to another.

Furthermore, in portions of the description above, the hopping is described in terms of frequency hopping among carriers. However, hopping sequences can indicate hops among any resources or combination of resources. Embodiments of the present invention are equally applicable to time hopping, code hopping, or the hopping of any other communications resource. Alternately, a hopping sequence may indicate hopping among a combination of resources. For example, a single hop may hop both carrier and time slot.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave of other propagation medium via a communication link (e.g., a modem or network connection).

Embodiments of the present invention may be provided as a modified family of hopping sequences stored in a device, such as a base station or a user terminal, in the wireless network, where the family of hopping sequences was generated using a modification according to an embodiment of the present invention. Other embodiments of the present invention may be provided as instructions capable of modifying hopping sequences on the fly according to embodiments of the present invention.

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
   selected a hopping sequence from among a stored family of hopping sequences, the selected hopping sequence indicating a sequence of carrier frequencies for communications in a logical channel of a wireless radio communications network over time;

eliminating a carrier frequency from the hopping of carrier frequencies indicated by the selected hopping sequence;

selecting a replacement hopping sequence from the family of hopping sequences, wherein the replacement hopping sequence indicates a sequence of replacement carrier frequencies over time;

eliminating the replacement hopping sequence from the family of hopping sequences; and replacing an occurrence of the eliminated carrier frequency in the sequence of carrier frequencies indicated by the selected hopping sequence with a corresponding replacement carrier frequency in the sequence of replacement carrier frequencies indicated by the replacement hopping sequence.

2. The method of claim 1, further comprising
replacing each occurrence of the eliminated carrier frequency in each sequence of carrier frequencies indicated by the each hopping sequence in the family of hopping sequences with another corresponding replacement carrier frequency in the sequence of replacement carrier frequencies indicated by the replacement hopping sequence.

3. A method comprising:
eliminating a resource from a plurality of resources for wireless communications according to a first hopping sequence, the first hopping sequence belonging to a family of hopping sequences;

replacing the eliminated resource in the first hopping sequence with an alternate resource from a second hopping sequence in the family of hopping sequences; and eliminating the second hopping sequence from the family of hopping sequences.

4. The method of claim 3, further comprising:
receiving a list indicating a number of available resources;
repeating
   eliminating a resource from the plurality of resources in the first hopping sequence, and
   replacing the eliminated resource in the first hopping sequence,
until the first hopping sequence includes no more than the indicated number of available resources.

5. The method of claim 3, further comprising transmitting a signal on a logical channel after replacing the eliminated resource, the transmitting according to a sequence of resources indicated by the first hopping sequence.

6. The method of claim 3, wherein the plurality of resources comprise a plurality of carrier frequencies, and wherein the first hopping sequence indicates a sequence of carrier frequencies from the plurality of carrier frequencies for wireless communications by a logical channel over time.

7. The method of claim 3, wherein the family of hopping sequences comprises a plurality of hopping sequences generated using Orthogonal Latin Squares.

8. The method of claim 3, wherein replacing the eliminated resource in the first hopping sequence with the alternate resource comprises replacing each occurrence of the eliminated resource in the first hopping sequence with a corresponding resource in the second hopping sequence.

9. The method of claim 8, wherein the corresponding resource in the second hopping sequence comprises the resource indicated by the second hopping sequence at the same time that the first hopping sequence indicates the eliminated resource.

10. The method of claim 8, wherein the corresponding resource in the second hopping sequence comprises the resource mapped to by a second hopping function defining the second hopping sequence when the second hopping function is given a time input that results in a first hopping function defining the first hopping sequence mapping to the eliminated resource.

11. The method of claim 3, wherein the plurality of resources comprise a plurality of time slots on a time division multiple access (TDMA) frame, and wherein the first hopping sequence indicates a sequence of time slots from the plurality of time slots for wireless communications by a logical channel over time.

12. The method of claim 3, wherein the plurality of resources comprise a plurality of code division multiple access (CDMA) codes, and wherein the first hopping sequence indicates a sequence of CDMA codes from the plurality of CDMA codes for wireless communications by a logical channel over time.

13. A method comprising:
eliminating a resource from a plurality of resources of a family of hopping sequences;

eliminating a hopping sequence from the family of hopping sequences; and creating a new family of hopping sequences for wireless communications by replacing the eliminated resource in each remaining hopping sequence with a resource from the eliminated hopping sequence.

14. The method of claim 13, further comprising
repeating
   eliminating a resource,
   eliminating a hopping sequence, and
   creating a new family of hopping sequences,
until the new family of hopping sequences include no more than a desired number of resources.

15. The method of claim 13, further comprising receiving a list indicating a number of available resources, and wherein the desired number of resources is the indicated number of available resources.

16. The method of claim 13, further comprising transmitting a signal on a logical channel, the transmitting according to a sequence of resources indicated by a hopping sequence from the new family of hopping sequences.

17. The method of claim 13, wherein the plurality of resources comprise a plurality of carrier frequencies, and wherein the family of hopping sequences indicates a sequence of carrier frequencies from the plurality of carrier frequencies for wireless communications by a logical channel over time.

18. The method of claim 13, wherein the plurality of resources comprise a plurality of time slots on a time division multiple access (TDMA) frame, and wherein the first hopping sequence indicates a sequence of time slots from the plurality of time slots for wireless communications by a logical channel over time.

19. The method of claim 13, wherein the family of hopping sequences comprises a plurality of hopping sequences generated using Orthogonal Latin Squares.

20. The method of claim 13, wherein replacing the eliminated resource in each remaining hopping sequence with the alternate resource comprises replacing each occurrence of the eliminated resource in each hopping sequence that was not eliminated from the family of hopping sequences with a corresponding resource in the eliminated hopping sequence.

21. The method of claim 20, wherein the corresponding resource in the eliminated hopping sequence comprises the resource indicated by the eliminated hopping sequence at the same times that the remaining hopping sequences indicate the eliminated resource.

22. The method of claim 20, wherein the corresponding resource in the eliminated hopping sequence comprises the resource mapped to by a hopping function defining the eliminated hopping sequence when the hopping function is given time inputs that result in a plurality of hopping functions each defining one of the remaining hopping sequences mapping to the eliminated resource.

23. The method of claim 20, further comprising repeating
eliminating a resource,
eliminating a hopping sequence, and
creating a new family of hopping sequences,
until the new family of hopping sequences includes no more than a desired number of resources.

24. The method of claim 23, wherein if the corresponding resource in the eliminated hopping sequence has been eliminated due to a repeated elimination of resources, then the corresponding resource comprises a corresponding resource in a second eliminated hopping sequence, the second eliminated hopping sequence eliminated due to repeated elimination of hopping sequences.

25. A communications device comprising:
a transceiver for radio communications on at least one logical channel;
a memory for storing a family of hopping sequences; and
a processor communicatively coupled to the memory, the processor to:
eliminate a resource from a plurality of resources for wireless communications according to a first hopping sequence belonging to the family of hopping sequences,
replace the eliminated resource in the first hopping sequence with an alternate resource using a second hopping sequence in the family of hopping sequences, and
eliminate the second hopping sequence from the family of hopping sequences.

26. The communications device of claim 25, wherein the plurality of resources comprise a plurality of carrier frequencies, and wherein the first hopping sequence indicates a sequence of carrier frequencies from the plurality of carrier frequencies for wireless communications by a logical channel over time.

27. The communications device of claim 25, wherein replacing the eliminated resource in the first hopping sequence with the alternate resource comprises replacing each occurrence of the eliminated resource in the first hopping sequence with a corresponding resource in the second hopping sequence.

28. The communications device of claim 27, wherein the corresponding resource in the second hopping sequence comprises the resource indicated by the second hopping sequence at the same time that the first hopping sequence indicates the eliminated resource.

29. The communications device of claim 27, wherein the corresponding resource in the second hopping sequence comprises the resource mapped to by a second hopping function defining the second hopping sequence when the second hopping function is given a time input that results in a first hopping function defining the first hopping sequence mapping to the eliminated resource.

30. The communications device of claim 27, wherein the communications device comprises a base station in a wireless radio network.

31. The communications device of claim 25, wherein the communications device comprises a user terminal in a wireless radio network.

32. A modified hopping sequence for wireless communications, the modified hopping sequence generated by:
eliminating a resource from a plurality of resources used by a first hopping sequence to be modified, the first hopping sequence belonging to a family of hopping sequences;
modifying the first hopping sequence by replacing the eliminated resource in the first hopping sequence with an alternate resource from a second hopping sequence in the family of hopping sequences; and
eliminating the second hopping sequence from the family of hopping sequences.

33. The modified hopping sequence of claim 32, wherein the family of hopping sequences comprises a plurality of hopping sequences generated using Orthogonal Latin Squares.

34. The modified hopping sequence of claim 32, wherein replacing the eliminated resource in the first hopping sequence with the alternate resource comprises replacing each occurrence of the eliminated resource in the first hopping sequence with a corresponding resource in the second hopping sequence.

35. The modified hopping sequence of claim 34, wherein the corresponding resource in the second hopping sequence comprises the resource indicated by the second hopping sequence at the same time that the first hopping sequence indicates the eliminated resource.

36. The modified hopping sequence of claim 34, wherein the corresponding resource in the second hopping sequence comprises the resource mapped to by a second hopping function defining the second hopping sequence when the second hopping function is given a time input that results in a first hopping function defining the first hopping sequence mapping to the eliminated resource.

37. A method comprising:
transmitting a signal on a logical channel according to a modified hopping sequence, the modified hopping sequence generated by:
eliminating a resource from a plurality of resources of a first hopping sequence to be modified, the first hopping sequence belonging to a family of hopping sequences;
modifying the first hopping sequence by replacing the eliminated resource in the first hopping sequence with an alternate resource from a second hopping sequence in the family of hopping sequences; and
eliminating the second hopping sequence from the family of hopping sequences.

38. The method of claim 37, further comprising:
receiving a designated number of resources available on the logical channel; and
repeating
eliminating a resource from the plurality of resources used by the first hopping sequence and
modifying the first hopping sequence
until the first hopping sequence includes no more than the designated number of resources.

39. The method of claim 37, wherein replacing the eliminated resource in the first hopping sequence with the alternate resource comprises replacing each occurrence of the eliminated resource in the first hopping sequence with a corresponding resource in the second hopping sequence.

40. The method of claim 39, wherein the corresponding resource in the second hopping sequence comprises the resource indicated by the second hopping sequence at the same time that the first hopping sequence indicates the eliminated resource.

41. The method of claim 39, wherein the corresponding resource in the second hopping sequence comprises the resource mapped to by a second hopping function defining the second hopping sequence when the second hopping function is given a time input that results in a first hopping function defining the first hopping sequence mapping to the eliminated resource.

* * * * *